United States Patent [19]

Celmer et al.

[11] 3,884,763
[45] May 20, 1975

[54] PRODUCTION OF RIFAMYCIN S AND RIFAMYCIN SV BY MICROMONOSPORA CHALCEA

[75] Inventors: Walter D. Celmer, New London; Walter P. Cullen, East Lyme; John B. Routien, New London, all of Conn.

[73] Assignee: Pfizer Inc., New York, N.Y.

[22] Filed: Mar. 11, 1974

[21] Appl. No.: 450,071

[52] U.S. Cl. .................................................. 195/96
[51] Int. Cl. .............................................. C12d 9/14
[58] Field of Search .......................... 195/96, 80, 51

[56] References Cited
UNITED STATES PATENTS 3,150,046   9/1964   Sensi et al. ...................... 195/80 R

OTHER PUBLICATIONS

Chem Abstracts 77:P600676
Chem Abstracts 68:47241Y

Primary Examiner—Lionel M. Shapiro
Assistant Examiner—T. G. Wiseman
Attorney, Agent, or Firm—Connolly and Hutz

[57] ABSTRACT

A process for producing rifamycin S and rifamycin SV by aerobically fermenting an aqueous nutrient medium with a strain of *Micromonospora chalcea*. The rifamycins are separated and recovered by reducing all the activity to rifamycin SV by treatment with ascorbic acid at the clarified fermentation broth stage or at one of the solvent stages of extraction and concentration. Rifamycin SV may be converted to rifamycin S by oxidation with activated manganese dioxide.

2 Claims, No Drawings

3,884,763

PRODUCTION OF RIFAMYCIN S AND RIFAMYCIN SV BY MICROMONOSPORA CHALCEA

BACKGROUND OF THE INVENTION

The rifamycins, a group of closely related antibiotics, are described in Il Farmaco, Ed. Sci. 14, 146 (1959); Antibiotics Ann. 1959/1960, 262 (1960a); Experientia 16, 412 (1960); Il Farmaco, Ed. Sci. 16, 165 (1961); Res. Progr. Biol. Med. Chem. 1, 337 (1964); and Antibiotics 1, 256–264 (1967), Pergamon Press, 1st edition.

Fermentation studies dealing with the production of rifamycins by a strain of *Streptomyces mediterranei*, later re-classified *Nocardia mediterranei*, revealed that five antibiotic substances were produced which were named rifamycins A, B, C, D and E. The production of rifamycin SV by variant cultures of *Nocardia mediterranei* was reported in The Journal of Antibiotics 22, No. 12, 637 (1969) and 25, No. 6 (1972).

Rifamycin S and rifamycin SV are highly active against *Streptomyces pyogenes*, *Diplococcus pneumoniae*, *Staphylococcus aureus* and *Mycobacterium tuberculosis*. Rifamycin SV, considerably less toxic than rifamycin S, (Il Farmaco, Ed. Sci. 235–245 (1961) has found clinical application in the treatment of staphylococcal infections, especially the infections caused by staphylococcal strains resistant to other medically available antibiotics. The 3-(4-methylpiperazinyliminomethyl) derivative of rifamycin SV is widely used alone, or in combination with other antitubercular agents, for the treatment of pulmonary tuberculosis.

The constitution of the rifamycins was established by Prelog, V., Pure Appl. Chem. 7, 551 (1963b). The structures of rifamycin B (I), rifamycin 0 (II), rifamycin SV (III) and rifamycin S (IV) and the relationship between them are illustrated as follows:

SUMMARY OF THE INVENTION

This invention is concerned with a process for producing rifamycin S and rifamycin SV by aerobically propagating *Micromonospora chalcea* ATTC 21994 in an aqueous nutrient medium. The rifamycins are separated and recovered by treatment with ascorbic acid which reduces all the activity to rifamycin SV. Rifamycin SV may be converted to rifamycin S by oxidation with activated manganese dioxide.

DETAILED DESCRIPTION OF THE INVENTION

The present invention is concerned with the production of rifamycin S and rifamycin SV by aerobically propagating a strain of *Micrmonospora chalcea* in an aqueous nutrient medium.

Microorganisms belonging to the genus *Micromonospora* have been screened for the production of antibiotics. In particular, strains of *Micromonospora chalcea* have been investigated. Thirty five strains of *M. chalcea* were studied and found to produce no antibiotic activity (Mikrobiologiya 38, No. 5, 883 (1969). U.S. Pat. No. 3,454,696 describes a mixture of antibiotics produced by a strain of M. chalcea. An antibiotic produced by a strain of *M. chalcea* is reported in Antibiotiki 15, 483 (1970). Japanese Patent 2,034,245 claims an antibiotic produced by a strain of *M. chalcea*. In studies described in Antibiotiki 16, No. 11, 966 (1971), 1220 cultures of *Micromonospora* were isolated from soil samples and tested for their production of substances antagonistic to bacteria and tumors. A number of strains of *M. chalcea* were found to produce antibiotics active against gram-postive bacteria. However, none of these antibiotics was isolated and characterized.

The microorganism useful for the preparation of the antibiotics of this invention was isolated from a mud

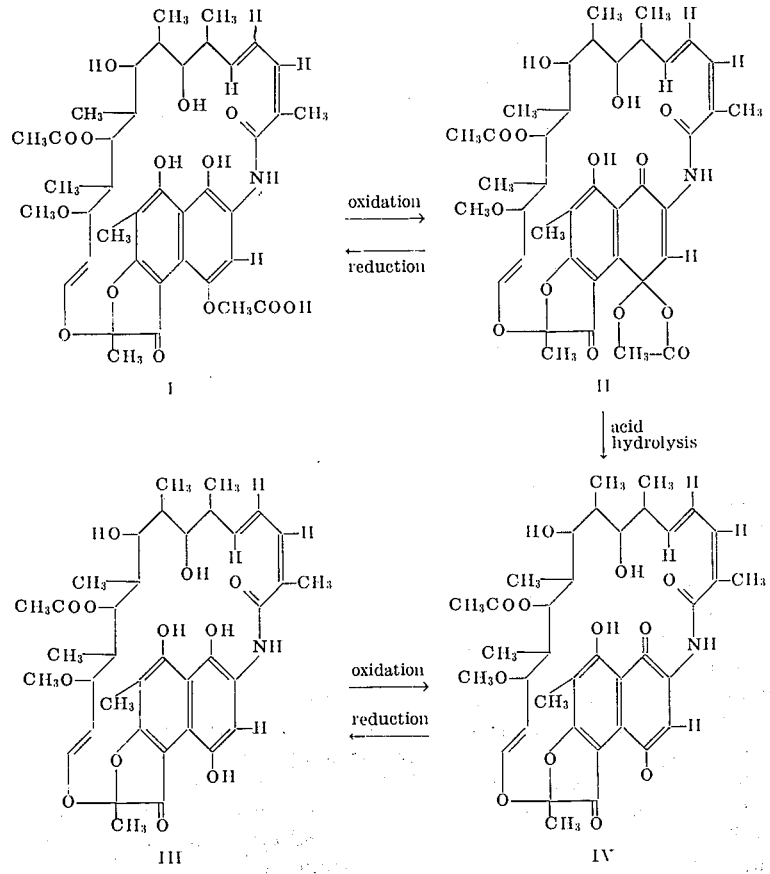

sample from Powers Lake, Connecticut. *Micromonospora chalcea* (Pfizer F.D. 23665) has been deposited in The American Type Culture Collection, Rockville, Md., and added to its collection as ATCC 21994.

Culture and identification media used for the characterization of the strain of *M. chalcea* and references for their composition are as follows:

1. Bennett's Agar (and 0.1 percent $CaCO_3$). Waksman, S.A., *The Actinomycetes*, Vol. 2, 1961. Medium 30 on p. 331.
2. Emerson's Agar (and 0.1 percent $CaCO_3$). Waksman, 1961. Medium 28 on p. 331.
3. Tomato-Paste Oatmeal Agar (and 0.1% $CaCO_3$). Waksman, 1961. Medium 34 on p. 332.
4. Glucose-Yeast Extract Agar (and 0.1% $CaCO_3$). Weinstein et al., 1968. p. 436.
5. Glucose-Asparagine Agar (and 0.1% $CaCO_3$). Waksman, 1961. Medium 2 on p. 328.
6. Starch. Waksman, 1961. Medium 21 on p. 330.
7. Gelatin. Waksman, 1961. Medium 20 on p. 330.
8. Tyrosine. Waksman, 1961. Medium 11 on p. 329 and R.E. Gordon and M. M. Smith, *Jr. Bact.* 69, 147–150, 1955.
9. Czapek-Sucrose Agar. Waksman, 1961. Medium 1 on p. 328.
10. Potato-Slice. G. M. Luedemann and B.C. Brodsky. *Antimicrobial Agents and Chemotherapy* - 1964: 47–52, 1965.
11. Potato-Slice with $CaCO_3$. Luedemann and Brodsky, 1965.
12. Carrot Plugs.
13. Tap Water Agar (2%).
14. Peptone Iron Agar. Waksman, 1961. Medium 38 on p. 332.
15. Difco Skim Milk
16. ATCC Medium No. 172. ATCC Catalog of Strains, 9th edition, p. 172, 1970.
17. Dextrose Nitrate Broth. Waksman, *The Actinomycetes*, 1950, p. 193.
18. Organic Nitrate Broth. Waksman, 1961. Medium 37 on p. 332.
19. Sucrose Invertase. M. Levine and H. W. Schoenlein, *A Compiliation of Culture Media*, 1930. Medium 622 on p. 176.
20. Cellulose. Levine and Schoenlein, 1930. Medium 2511 on p. 823.
21. Cellulose. H.L. Jensen, *Proc. Linnean Soc. N. S. Wales* 55, 231, 1930.
22. Nitrogen Utilization. Weinstein et al., 1968, p. 437.
23. Carbohydrate Utilization. Weinstein et al., 1968, p. 437.

*M. chalcea* was planted in tubes or petri dishes at least in duplicate for some long range tests. The methods were mainly those of M. J. Weinstein et al. as described in Antimicrobial Agents and Chemotherapy-1967, pp. 435–437, 1968. Incubation was at 28°C. except where otherwise noted. Readings were made at various intervals up to 14 days with some tests continued for longer periods of time. The color designations refer to color of chips in "Color Harmony Manual," fourth edition, 1958, published by The container Corporation of America, U.S.A., and in personal descriptive terms.

Characteristic of the genus *Micromonospora*, this strain of *M. chalcea* has no aerial mycelium. There are spores only on the substrate mycelium, and these are borne singly on hyphae.

The description of *M. chalcea* ATCC 21994 is as follows:

*Bennett's Agar plus $CaCO_3$*

Growth good, flat (raised and rough in one test), pinkish orange (near 4 ga) except for whitish bloom and black spots on spores; reverse pinkish orange to nearly black; yellow brown soluble pigment.

*Emerson's Agar plus $CaCO_3$*

Growth good to excellent, heavily roughened, orange (near 5 1a) except where covered with whitish bloom of minute, aerial hyphae; reverse color 5 1a; yellow soluble pigment.

*Tomato Paste Oatmeal Agar plus $CaCO_3$*

Growth moderate to good, rough from individual colonies, orange (near 4 pc) but with whitish bloom and black sporulating spots; reverse dull orange to near black; brown soluble pigment

*Potato Slice plus $CaCO_3$*

Growth good, roughened, dul orange (near 4 1c); no soluble pigment.

*Glucose Yeast Extract Agar plus $CaCO_3$*

Growth good, roughened by individual colonies, reddish orange with white bloom (near 5 1a); reverse same color as surface (but no bloom); bright yellow soluble pigment.

*Glucose Asparagine Agar plus $CaCO_3$*

Growth moderate, flat (almost lacking in one test), pale salmon orange to pinkish orange (near 4 ea); reverse same color as surface; no soluble pigment.

*Czapek Sucrose Agar*

Growth moderate, thin, pale yellowish (near 3 ga) to pale orange (near 4 1a); reverse pale orange; no soluble pigment or very pale yellow.

*Tyrosine Agar*

Growth poor, slightly roughened, pale yellowish orange (near 4 1a to 3 1a) with black specks; reverse color like surface growth; no soluble pigment (but brown on Gordon and Smith's medium); no odor.

*Potato Slice*

Growth good, roughened, dul orange (near 4 pc) to bright orange (near 5 pa); no soluble pigment.

*Gelatin*

Growth moderate to good, flat, covered with whitish bloom and black spots; no soluble pigment.

*Carrot Plugs*

No growth.

*Starch Agar*

Growth thin, flat, colorless except for orange (near 4 pa) spots.

*Biochemical Properties*

No reduction of nitrates to nitrites in either medium; starch hydrolyzed only directly under culture in one test and not at all another time; gelatin liquefied promptly and vigorously; $H_2S$ produced even in four days (darkening of lead acetate strips); tyrosine not digested; coagulation and peptonization of milk in seven days and peptonization complete in 38 days; sucrose inversion by 17 days; growth on both cellulose media in eight days with disintegration in both media in 21 days; sodium nitrate, asparagine and glutamic acid not used as nitrogen sources but both NZ-Amine A and yeast extract utilized well; poor to good growth at 21°C, good growth at 28°C. and 37°C. but very poor growth in spots at 45°C.; only a light brown soluble pigment produced in peptone iron agar; a summary of several tests for carbohydrate utilization showed: L-arabinose, galactose, glucose, lactose, levulose, D-mannose, starch, sucrose, trehalose and xylose utilized; adonitol, cellulose, dulcitol, inositol, D-mannitol, raffinose, rhamnose, d(-)ribose and d(-)sorbitol not utilized; D-melibiose variable.

Spores

Spores produced on tap water agar after two weeks at 28°C. were round to oval, mostly 0.8–1.0 microns wide, rarely 1.5 or 1.5 × 1.0 microns, stalked, in dense clusters or scattered along hyphae; surface of pores slightly roughened when viewed by scanning electron microscope.

This culture was compared with the description of M. chalcea as given in Bergey's Manual of Determinative Bacteriology, seventh edition, and with the discussion of this species by G.M. Luedemann, International J. System. Bact. 21, 248–253 (1971) and H.L. Jensen, Proc. Linnean Soc. N.S. Wales 47, 173–180 (1932). Although there are minor differences in pigment production and utilization of two sugars as reported, it best fitted the description of M. chalcea and was identified as that species.

Cultivation of M. chalcea preferably takes place in aqueous nutrient media at a temperature of about 24°–36°C. under aerobic, submerged conditions with agitation. Nutrient media which are useful for such purposes include a source of assimilable carbon such as sugars, starch, glycerol and molasses; a source of organic nitrogen such as casein, enzymatic digest of casein, meat meal, wheat gluten, cotton seed meal, soybean meal and peanut meal. A source of growth substances such as distiller's solubles and/or yeast extract as well as salts such as sodium chloride, ammonium acetate, ammonium sulfate, potassium phosphate and trace minerals such as iron, magnesium, cobalt, zinc and manganese may also be utilized with advantageous results. If excessive foaming is encountered during fermentation, antifoam agents such as vegetable oils or silicones may be added to the fermentation medium. The pH of the fermentation tends to remain rather constant but if variations are encountered, a buffering agent such as calcium carbonate may also be added to the medium. Aeration of the medium in tanks for submerged growth is preferably maintained at the rate of about ½ to 2 volumes of free air per volume of broth per minute. Agitation may be maintained by means of agitators generally familiar to those in the fermentation industry. Aseptic conditions must, of course, be maintained through the transfer of the microorganism and throughout its growth.

Inoculum for the preparation of the rifamycin mixture may be obtained by employing growth from slants of M. chalcea on such media as ATCC Medium 172 to which previous reference was made. The growth may be used to inoculate either shake flasks or inoculum tanks, or alternatively, the inoculum tanks may be seeded from the shake flasks. The growth of the microorganism usually reaches its maximum in about two or three days. However, variations in the equipment used, aeration, rate of stirring, etc., may effect the speed with which the maximum growth is reached. In general, the fermentation is conducted until substantial antimicrobial activity is imparted to the medium, a period of from about 24 hours to about 4 days being sufficient for most purposes.

The process of antibiotic production is conveniently followed during fermentation by biological assay of the broth employing a sensitive strain of Staphylococcus aureus. Standard plate assay technique is employed in which the zone of inhibition surrounding a filter paper disc saturated with the broth is used as a measure of antibiotic potency. After the fermentation broth has reached a level of substantial antibiotic potency, the pH is usually about 7.5–8.5, the mycelium is removed by filtration or centrifugation. Various types of equipment such as filter presses, centrifuges, etc. may be employed.

Thin layer chromatography employing silica gel is a useful tool for analyzing the antibiotic mixture produced by M. chalcea in fermentation media and the composition of crude and purified materials extracted from clarified fermentation broths. The resolution of the components of the antibiotic mixture is importantly dependent on antibiotic loading of the system. Too little antibiotic potency fails to reveal minor antibiotic components; too much antibiotic potency results in a dragging effect with resulting poor resolution.

The developing system for the thin layer chromatography is the upper layer prepared from ethyl acetate, tetrahydrofuran and water (4:1:5). Bioautographic detection of the antibiotic components may be accomplished by means of an overlay of a thin layer of agar seeded with a sensitive strain of Staphylococcus aureus or other sensitive organism. The thin layer chromatograms, after development, may also be examined visually. The antibiotics present in the antibiotic mixture are all highly colored with various shades of orange, yellow and pink.

EXAMPLE I

A sterile aqueous medium having the following composition is prepared:

|  | Grams/liter |
|---|---|
| Starch | 20.0 |
| Enzymatic digest of casein | 5.0 |
| Yeast extract | 5.0 |
| Dextrose | 10.0 |
| $K_2HPO_4$ | 0.5 |
| $CaCO_3$ | 4.0 |

Cells from a ATCC No. 172 slant of M. chalcea ATCC 21994 are transferred to a series of 3-liter Fernbach flasks each containing a liter of the above described medium. The inoculated flasks are shaken on a rotary shaker for 3–4 days at about 28°C. About 1% v/v of the grown inoculum is transferred to a fermentor containing 150 gallons of sterile medium of the following composition:

|  | Grams/liter |
|---|---|
| Starch | 25.0 |
| Enzymatic digest of casein | 15.0 |
| dl-Methionine | 1.0 |
| Ammonium acetate | 0.5 |
| Ammonium sulfate | 0.1 |
| Sucrose | 1.0 |
| Meat meal | 10.0 |
| $K_2HPO_4$ | 0.4 |
| $CaCO_3$ | 4.0 |
| $FeSO_4 \cdot 7H_2O$ | 0.02 |
| $MgSO_4 \cdot 7H_2O$ | 0.1 |
| $ZnSO_4 \cdot 7H_2O$ | 0.002 |
| $MnCl_2$ | 0.002 |
| $CoCl_2 \cdot 6H_2O$ | 0.002 |

The temperature is maintained at about 30°C. and the broth is stirred at 1,150 rpm and aerated at the rate of ½ volume of air per volume of broth per minute. After 35–45 hours, 5% v/v of this grown inoculum is transferred to a fermentor containing 1000 gallons of the sterile medium described above. The temperature is maintained at 30°c., aeration at ½ volume of air per volume of broth per minute and stirring at 600 rpm. Soybean oil is added as need to control excessive foaming. After 50–60 hours, 5–10 percent v/v of this grown inoculum is transferred to a fermentor containing 10,000 gallons of sterile medium which is the same as that described above but without meat meal. The temperature is maintained at 30°C., aeration at the rate of ½ volume of air per volume of broth per minute and stirring at 380 rpm. Soybean oil is added as necessary to control foam. Sucrose or dextrose is added at 24 hour intervals to a level of about 0.1 percent w/v. The fermentation is substantially complete in about 90 to 120 hours.

The components of the antibiotic mixture may be recovered from fermentation broth by a number of different procedures including solvent extraction and column chromatography or combinations thereof. Various water-immiscible organic solvents are useful in extracting the antibiotics from clarified broth. Methyl isobutyl ketone is a particularly effective solvent. Solvent extraction is preferably carried out using a volume of solvent approximately equal to about 1/5 the volume of broth from which it is desired to recover the antibiotic mixture. Depending on volumes of broth involved, various pieces of equipment such as separatory funnels, stirred tanks and mechanical extracting devices such as centrifugal separators are helpful for extraction purposes.

The proportions of rifamycin S and rifamycin SV produced by *M. chalcea* ATCC 21994 may vary somewhat from run to run but in general rifamycin SV is the preponderantly produced antibiotic. The rifamycins are preferably separated and isolated in the reduced state. Thus, all of the antibiotic mixture is converted to rifamycin SV. This may be accomplished by adding ascorbic acid to the clarified fermentation broth before solvent extraction at a level of about 2 grams per gram of antibiotic mixture and stirring for about 30 minutes at room temperature. Alternatively, the antibiotics may be reduced with ascorbic acid at one of the solvent stages of extraction and concentration.

The preferred method of separation and recovery of the components of the antibiotic mixture is as follows: The clarified fermentation broth is adjusted to pH 4.0–4.5 and extracted with about 1/5 volume of methyl isobutyl ketone. The ketone is removed under vacuum and replaced with industrial ethanol. The ethanol solution is defatted by repeated extraction with petroleum ether. The rifamycins are reduced with ascorbic acid, the ethanol removed under vacuum and the residue taken up in chloroform. The chloroform is evaporated under vacuum and the residue is chromatographed on a silica gel column using ethyl acetate with increasing concentrations of acetone as the developing solvent. Column cuts are followed by thin layer chromatography and bioassay. The acetone concentration in the ethyl acetate-acetone developing mixture is raised stepwise to about 35–50 percent. The heart cut is eluted and concentrated yielding rifamycin SV.

Rifamycin SV is readily converted to rifamycin S by oxidation with air or preferably by treatment with activated manganese dioxide which is prepared by azeotropic drying of manganese dioxide as described in J. Org. Chem. 34, No. 6, 1979 (1969). A slurry of activated manganese dioxide, approximately a gram per gram of antibiotic, is added to a methanolic or ethyl acetate solution of the antibiotic and stirred for about 30 minutes at room temperature at which time the oxidation is substantially complete. The reaction mixture is clarified by filtration or centrifugation and the solvent removed under vacuum.

What is claimed is:
1. A process for producing rifamycin S and rifamycin SV which comprises aerobically propagating *Micromonospora chalcea* ATCC 21994 in an aqueous nutrient medium and separating the rifamycins therefrom.
2. The process of claim 1 wherein rifamycin S and rifamycin SV are separated and recovered by a sequence of steps comprising:
   a. extracting the antibiotics from the clarified, acidified broth with methyl isobutyl ketone;
   b. removing the methyl isobutyl ketone and replacing with ethanol;
   c. defatting the ethanol solution with petroleum ether;
   d. reducing the rifamycin S in the ethanolic solution to rifamycin SV by addition of ascorbic acid;
   e. removing the ethanol and replacing with chloroform;
   f. removing the chloroform and chromatographing the residue on a silica gel column;
   g. eluting rifamycin SV;
   h. optionally oxidizing rifamycin SV to rifamycin S by contacting with activated manganese dioxide.

* * * * *

UNITED STATES PATENT OFFICE
CERTIFICATE OF CORRECTION

PATENT NO. : 3,884,763
DATED : May 20, 1975
INVENTOR(S) : Walter D. Celmer et al It is certified that error appears in the above-identified patent and that said Letters Patent are hereby corrected as shown below:

Column 1, third paragraph, line 2, change "Streptomyces pyogenes" to --Streptococcus pyogenes--.

Signed and Sealed this twenty-third Day of December 1975

[SEAL]

Attest:

RUTH C. MASON
*Attesting Officer*

C. MARSHALL DANN
*Commissioner of Patents and Trademarks*